(12) United States Patent
Hao et al.

(10) Patent No.: US 12,315,356 B2
(45) Date of Patent: May 27, 2025

(54) METHOD FOR WARNING BATTERY OVERHEAT

(71) Applicant: Shanghai Makesens Energy Storage Technology Co., Ltd., Shanghai (CN)

(72) Inventors: Pingchao Hao, Shanghai (CN); Xiaohua Chen, Shanghai (CN); Xiao Yan, Shanghai (CN); Enhai Zhao, Shanghai (CN)

(73) Assignee: Shanghai Makesens Energy Storage Technology Co., Ltd., Shanghai (CN)

( * ) Notice: Subject to any disclaimer, the term of this patent is extended or adjusted under 35 U.S.C. 154(b) by 51 days.

(21) Appl. No.: 18/236,960

(22) Filed: Aug. 23, 2023

(65) Prior Publication Data
US 2024/0071200 A1 Feb. 29, 2024

(30) Foreign Application Priority Data
Aug. 25, 2022 (CN) .......................... 202211028030.4

(51) Int. Cl.
*G08B 21/18* (2006.01)
(52) U.S. Cl.
CPC .................... *G08B 21/182* (2013.01)
(58) Field of Classification Search
CPC .................................................. G08B 21/182
See application file for complete search history.

(56) References Cited

U.S. PATENT DOCUMENTS 11,715,858 B1 * 8/2023 Jannu ................ H01M 50/103
429/100

FOREIGN PATENT DOCUMENTS

| CN | 216390497 | * | 8/2021 | |
|---|---|---|---|---|
| CN | 11482456 | * | 4/2022 | .......... H01M 50/581 |
| KR | 20160080381 | * | 12/2014 | ................ H02J 7/00 |
| WO | WO 2022198469 | * | 3/2024 | .......... H01M 10/617 |

* cited by examiner

Primary Examiner — Hongmin Fan
(74) Attorney, Agent, or Firm — IPRTOP LLC

(57) ABSTRACT

A battery overheat warning method, a battery overheat warning system, a storage medium, and an electronic device are provided. The battery overheat warning method comprises: obtaining working condition parameters and geometric parameters of a battery; obtaining a theoretical temperature of a target position in the battery based on the working condition parameters and the geometric parameters of the battery; obtaining an actual temperature of the target position in the battery by using a temperature transducer; and sending an overheat warning signal based on the theoretical temperature and the actual temperature of the target position in the battery. The battery overheat warning method has relatively high timeliness and accuracy.

10 Claims, 5 Drawing Sheets

METHOD FOR WARNING BATTERY OVERHEAT

CROSS REFERENCE TO RELATED APPLICATION

The present application claims the benefit of priority to Chinese Patent Application No. CN 202211028030.4, entitled "WARNING METHOD, WARNING SYSTEM, STORAGE MEDIUM, AND ELECTRONIC DEVICE", filed with CNIPA on Aug. 25, 2022, the disclosure of which is incorporated herein by reference in its entirety for all purposes.

FIELD OF INVENTION

The present disclosure relates to electronics overheat warning methods, and in particular, to a battery overheat warning method, a battery overheat warning system, a storage medium, and an electronic device.

BACKGROUND OF THE INVENTION

In modern electric smart grids, electric energy storage is a crucial technology that enhances integration and effective use of large-scale centralized and distributed renewable energy sources. After an energy storage power station is connected to the power grid, it can not only serve as a distributed energy storage facility on the consumer side of the power system, improve the accessibility of distributed renewable energy generation, and play a role in regulating the load of the power grid, but also provide reverse power to the power grid as a distributed power source, offering auxiliary services such as peak shaving and frequency regulation to the grid, allowing for better peak shaving and valley filling of the power system.

In practice, to keep energy storage power stations running smoothly, they use a large number of lithium batteries. During operation, lithium batteries may experience issues such as aging, overheating, and circuit failure, which can compromise the safety of the energy storage power station. Current technology typically determines whether there is a danger in the energy storage power station based on temperature readings from sensors within the power station. However, this method is not very timely or accurate.

SUMMARY

A first embodiment of the present disclosure provides a battery overheat warning method. The battery overheat warning method comprises: obtaining working condition parameters and geometric parameters of a battery; obtaining a theoretical temperature of a target position in the battery based on the working condition parameters and the geometric parameters of the battery; obtaining an actual temperature of the target position in the battery by using a temperature transducer; and sending an overheat warning based on the theoretical temperature and the actual temperature of the target position in the battery.

According to the first embodiment, the method includes obtaining the theoretical temperature of a target position in the battery based on the working condition parameters and the geometric parameters of the battery comprises: obtaining a total battery heat based on the working condition parameters of the battery, wherein the total battery heat comprises a heat absorbed and/or a heat released by the battery; generating a battery mesh based on the geometric parameters of the battery; and obtaining the theoretical temperature of the target position in the battery based on the total battery heat and the battery mesh.

According to the embodiment, obtaining the total battery heat based on the working condition parameters of the battery comprises: obtaining electrochemical parameters of the battery based on the working condition parameters of the battery; obtaining a polarization heat, a reaction heat, and an ohmic heat of the battery based on the electrochemical parameters of the battery; and obtaining the total battery heat based on the polarization heat, the reaction heat, and the ohmic heat of the battery.

According to the embodiment, obtaining the theoretical temperature of the target position in the battery based on the total battery heat and the battery mesh comprises: constructing a heat conduction equation based on the total battery heat and the battery mesh; discretizing the heat conduction equation; and solving the discretized heat conduction equation to obtain the theoretical temperature of the target position in the battery.

According to the embodiment, sending the warning signal based on the theoretical temperature and the actual temperature of the target position in the battery comprises: obtaining a difference between the theoretical temperature and the actual temperature of the target position in the battery; determining a warning signal level based on the difference between the theoretical temperature and the actual temperature of the target position in the battery; and executing a corresponding warning scheme based on the warning signal level.

According to the embodiment, the working condition parameters of the battery comprises a current and a voltage in an operating state of the battery, and the geometric parameters of the battery comprise a size, a tab position, and a tab size of the battery.

According to the embodiment, the battery comprises a lithium battery in an energy storage power station.

A second embodiment of the present disclosure provides a battery overheat warning system. The battery overheat warning system comprises: a battery-parameter-obtaining module, configured to obtain working condition parameters and geometric parameters of a battery; a theoretical-temperature-obtaining module, configured to obtain a theoretical temperature of a target position in the battery based on the working condition parameters and the geometric parameters of the battery; an actual-temperature-obtaining module, configured to obtain an actual temperature of the target position in the battery by using a temperature transducer; and a warning module, configured to decide whether a warning should be sent based on the theoretical temperature and the actual temperature of the target position in the battery.

A third embodiment of the present disclosure provides a non-transitory computer-readable storage medium, storing a computer program, wherein when the computer program is executed by a processor, the battery overheat warning method in any of the embodiments of the present disclosure is implemented.

A fourth embodiment of the present disclosure provides an electronic device. The electronic device comprises: a memory, storing a computer program; and a processor, communicatively connected to the memory, wherein when the computer program is invoked, the battery overheat warning method in any of the embodiments of the present disclosure is performed.

The battery overheat warning method, the battery overheat warning system, the storage medium, and the electronic device in one or more embodiments of the present disclosure have the following beneficial effects:

According to the battery overheat warning method, the theoretical temperature of the target position in the battery can be obtained based on the working condition parameters and the geometric parameters of the battery, and the actual temperature of the target position in the battery is obtained through a transducer. Based on the theoretical temperature and the actual temperature of the target position in the battery, a warning signal level of the energy storage power station can be accurately and timely determined to decide whether a warning should be sent.

In addition, according to the battery overheat warning method, the warning signal level of the energy storage power station may be determined based on the difference between the theoretical temperature and the actual temperature of the target position in the battery, to decide whether a warning should be sent. Therefore, even if the actual temperature of the target position in the battery collected by the temperature transducer is normal, an abnormal status of the battery can still be found, triggering a warning.

Also, the discrete heat conduction equation can be solved by generating the battery mesh and employing finite volume and finite element methods, which enhances precision and accuracy of the method.

Further, energy storage power stations are typically equipped with temperature sensors recording the actual temperature of target locations, as well as devices monitoring batteries' operating parameters during normal operation. As a result, the battery overheat warning method of the present disclosure is compatible to the current temperature sensors and battery operating parameters, thereby minimizing labor and material costs while enhancing accuracy.

REFERENCE NUMERALS

Figure 1:
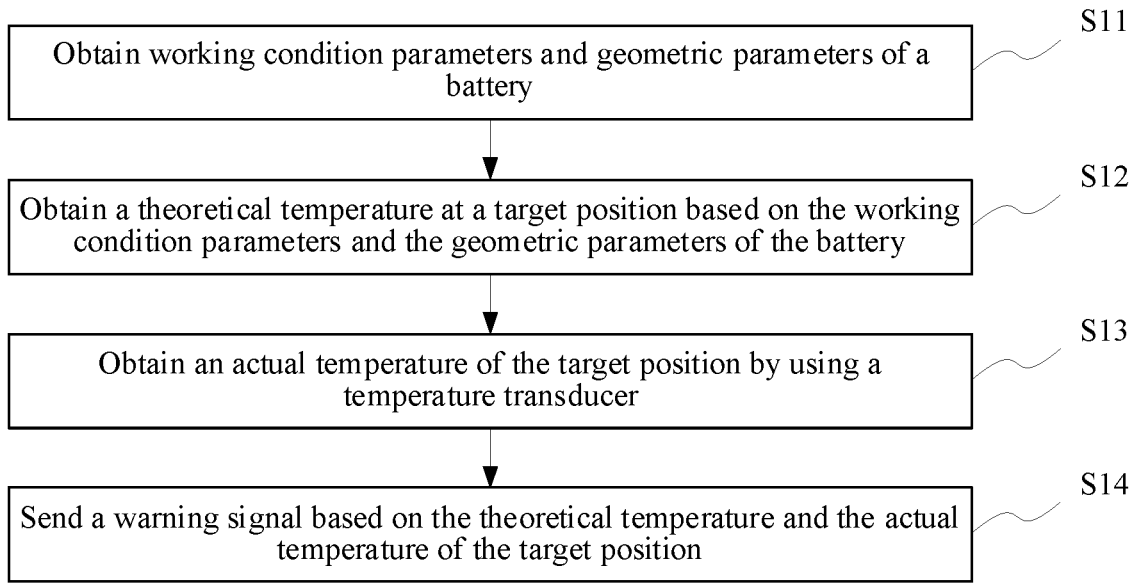
FIG. 1 is a flowchart of a battery overheat warning method according to an embodiment of the present disclosure.

600 Battery overheat warning system
610 Battery-parameter-obtaining module
620 Theoretical-temperature-obtaining module
630 Actual-temperature-obtaining module
640 Battery overheat warning module
700 Electronic device
710 Memory
720 Processor
730 Display
S11-S14 Steps
S21-S23 Steps
S31-S33 Steps
S41-S43 Steps
S51-S53 Steps

DETAILED DESCRIPTION

Implementations of the present disclosure are described below through specific examples, and a person skilled in the art can easily understand other advantages and effects of the present disclosure from the contents disclosed in this specification. The present disclosure may further be implemented or applied through other different specific implementations, and various details in this specification may also be modified or changed based on different viewpoints and applications without departing from the spirit of the present disclosure. It should be noted that the following embodiments and features in the embodiments may be combined with each other if no conflicts will result.

It should be noted that, the drawings accompanying the following embodiments show the basic idea of the present disclosure in a schematic manner, and only components closely related to the present disclosure are shown in the drawings. The drawings are not necessarily drawn according to the number, shape and size of the components in actual implementation; during the actual implementation, the type, quantity and proportion of each component can be changed as needed, and the layout of the components can also be more complicated.

In addition, herein, terms such as "first", "second", etc. are only used to distinguish one entity or operation from another entity or operation, and do not necessarily require these entities or operations be in a certain order.

In practice, energy storage power stations use a large number of lithium batteries to maintain normal operation. During operation, lithium batteries may experience issues such as aging, overheating, and circuit failure, which can compromise the safety of the energy storage power station. Current technology typically determines whether there is danger in the energy storage power station based on temperature readings from sensors within the station. However, after research and practice, the inventors discovered that when a battery in an energy storage power station first begins to fail, the temperature readings from sensors are usually still within normal range. As a result, relying solely on temperature readings and other indicators from sensors for early warning can result in poor timeliness and low accuracy.

The present disclosure provides a battery overheat warning method. The battery overheat warning method is described in detail through specific embodiments with reference to the accompanying drawings.

In an embodiment of the present disclosure, the battery overheat warning method is applicable to an energy storage power station. FIG. 1 is a flowchart of the battery overheat warning method in one embodiment. As shown in FIG. 1, the battery overheat warning method comprises steps S11 to S14.

S11: Obtain working condition parameters and geometric parameters of a battery. The battery may be, for example, a lithium battery in an energy storage power station. The working condition parameters of the battery are parameters indicating working conditions of the battery, which may comprise, for example, a current and a voltage of the battery when it is operating. Preferably, the working condition parameters of the battery may come with individual timestamps. The geometric parameters of the battery refer to parameters that indicate the geometric shape of the battery, such as dimensions of the battery, positions of battery tabs on the battery, and dimensions of the battery tabs.

S12: Obtain a theoretical temperature of a target position in the battery based on the working condition parameters and the geometric parameters of the battery. The target position in the battery may be specified according to actual needs, and may be a realistic position in space.

S13: Obtain an actual temperature of the target position in the battery by using a temperature transducer. The temperature transducer is a transducer configured to sense the actual temperature of the target position in the battery and convert the actual temperature into an available output signal. In step S13, a contact or non-contact transducer may be used to obtain the actual temperature of the target position in the battery.

S14: Send an overheat warning based on the theoretical temperature and the actual temperature of the target position in the battery. For example, based on the difference between the theoretical temperature and the actual temperature of the target position in the battery, whether a faulty point exists in the battery, or the severity thereof, may be determined, and then a corresponding warning strategy is implemented.

Thus, the theoretical temperature of the target position in the battery can be obtained based on the working condition parameters and the geometric parameters of the battery, and the actual temperature of the target position in the battery is obtained through a transducer. Based on the theoretical temperature and the actual temperature of the target position in the battery, a warning signal level of the energy storage power station can be accurately and timely determined to decide whether a warning should be sent. In addition, in the battery overheat warning method, the warning signal level of the energy storage power station may be determined based on the difference between the theoretical temperature and the actual temperature of the target position in the battery, to decide whether a warning should be sent. Therefore, even if the actual temperature of the target position in the battery collected by the temperature transducer is normal, an abnormal status of the battery can still be found, which triggers a warning signal.

Figure 2:
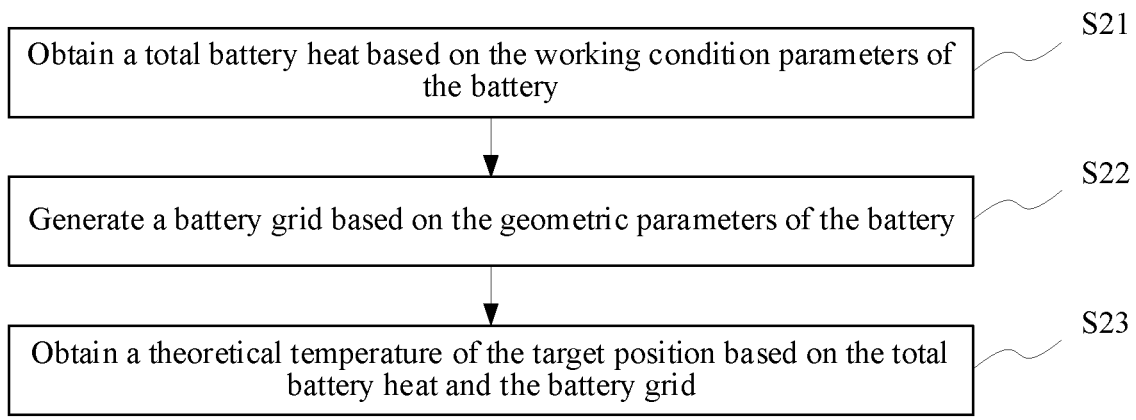
FIG. 2 is a flowchart of sub-steps of obtaining a theoretical temperature according to an embodiment of the present disclosure.

Referring to FIG. 2, in an embodiment of the present disclosure, obtaining the theoretical temperature of the target position in the battery based on the working condition parameters and the geometric parameters of the battery comprises sub-steps S21 to S23.

S21: Obtain a total battery heat based on the working condition parameters of the battery, wherein the total battery heat may be a heat absorbed and/or a heat released by the battery.

S22: Generate a battery mesh based on the geometric parameters of the battery. For example, in sub-steps S22, the battery mesh may be automatically generated based on a length, a width, a height of the battery, and parameters of battery tabs of the battery, by using software such as Gmsh (a three-dimensional finite element mesh generator CAD tool), or the battery mesh may be generated manually.

S23: Obtain a theoretical temperature of the target position in the battery based on the total battery heat and the battery mesh.

Figure 3:
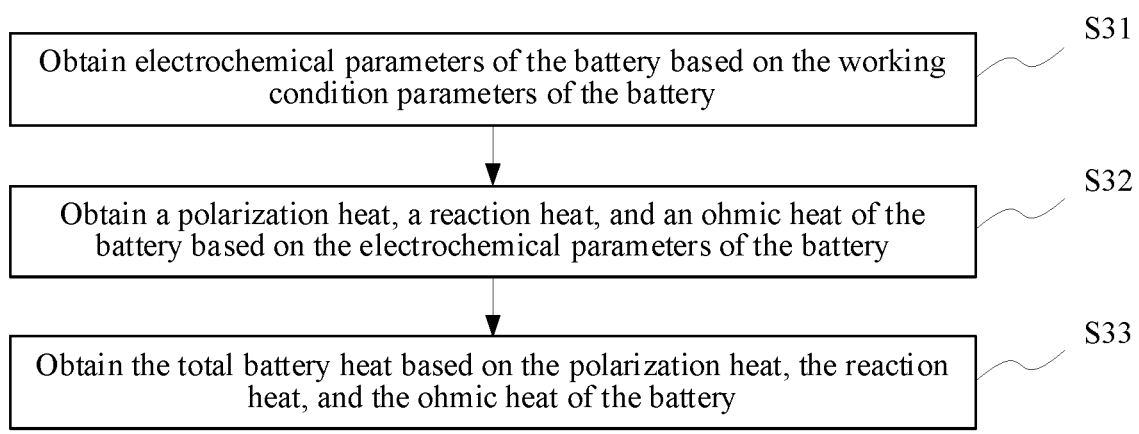
FIG. 3 is a flowchart of sub-steps of obtaining a total battery heat according to an embodiment of the present disclosure.

Optionally, referring to FIG. 3, obtaining the total battery heat based on the working condition parameters of the battery comprises sub-steps S31 to S33.

S31: Obtain electrochemical parameters of the battery based on the working condition parameters of the battery. The electrochemical parameters of the battery may comprise, for example, a thickness of a positive electrode/negative electrode of the battery, a particle size of the positive electrode/negative electrode, a volume fraction of active materials of the positive electrode/negative electrode, an initial lithium ion concentration of the positive electrode/negative electrode, a maximum lithium ion concentration of the positive electrode negative electrode, and a material porosity of the positive electrode/negative electrode of the battery.

Optionally, in sub-step S31, the working condition parameters of the battery may be processed by using a genetic algorithm (GA), to obtain the electrochemical parameters of the battery. Specifically, the genetic algorithm is a method that searches for the optimal solution by simulating the process of natural evolution. This genetic algorithm uses mathematical methods and computer simulations to transform a problem-solving process into processes similar to the crossover and mutation of chromosomes and genes in biological evolution. In the present disclosure, when obtaining the battery's electrochemical parameters, the genetic algorithm can obtain the better optimization results more quickly than some conventional optimization algorithms.

S32: Obtain a polarization heat, a reaction heat, and an ohmic heat of the battery based on the electrochemical parameters of the battery. The polarization heat in an electrochemical battery is the heat converted from energy loss during electric current passing between the electrodes during discharge.

S33: Obtain the total battery heat based on the polarization heat, the reaction heat, and the ohmic heat of the battery.

Specifically, in sub-step S33, the polarization heat $Q_{act}$, the reaction heat $Q_{rea}$, the ohmic heat $Q_{ohm}$, and the total battery heat Q may be respectively obtained by applying formula (1) to formula (4) as shown below:

$$Q_{act} = a_s \times F \times j_n \times (\phi_s - \phi_e - F \times j_n \times R_{SEI}) = a_s \times F \times j_n \times \eta, \; ; \quad \text{formula (1)}$$

$$Q_{rea} = a_s \times F \times j_n \times T \times \frac{dU}{dT}, \; ; \quad \text{formula (2)}$$

$$Q_{ohm} = \sigma_s^{eff} \times \left(\frac{\partial \phi_s}{\partial x}\right)^2 + \sigma_e^{eff} \times \left(\frac{\partial \phi_e}{\partial x}\right)^2 + \quad \text{formula (3)}$$

$$\frac{2 \times \sigma_e^{eff} \times R \times T}{F} \times (1 - t_+) \times \frac{\partial \ln c_e}{\partial x} \frac{\partial \phi_e}{\partial x}, \; ; \text{and}$$

$$Q = \int_{x=0}^{L_n + L_{sep} + L_p} (Q_{act} + Q_{rea} + Q_{ohm}) dx/(L_n + L_{sep} + L_p), . \quad \text{formula (4)}$$

$a_s$ represents an effective reaction area of materials, F represents the Faraday constant, $j_n$ represents a molar flux of lithium ions, η represents an overpotential, $\phi_s$ represents a solid phase potential, $\phi_e$ represents a liquid phase potential, $R_{SEI}$ represents a solid-electrolyte-interphase (SEI) film resistance, R represents the universal gas constant, T represents a present temperature, $$\frac{dU}{dT}$$

represents an entropy change coefficient of the materials, $\sigma_s^{eff}$ represents effective conductivity of a solid phase of the materials, $\sigma_e^{eff}$ represents effective conductivity of a liquid phase of the material, $t_+$ represents a migration number of lithium ions, $c_e$ represents a concentration of the liquid phase, x represents a position, $L_n$ represents a thickness of the negative electrode, $L_{sep}$ represents a thickness of a separator, and $L_p$ represents a thickness of the positive electrode. Especially, if the total heat Q calculated according to the above formula (4) has a positive value, it indicates that the battery is releasing heat, otherwise it indicates that the battery is absorbing heat. In addition, a temperature change per unit volume may further be obtained based on a specific heat capacity, mass, and the total heat Q.

Figure 4:
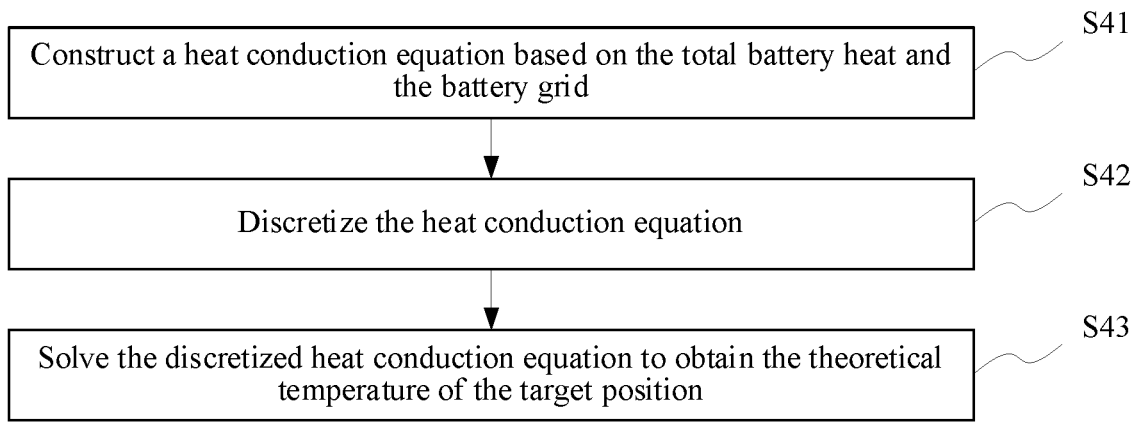
FIG. 4 is a flowchart of sub-steps of obtaining a theoretical temperature according to an embodiment of the present disclosure.

Optionally, referring to FIG. 4, in one embodiment, obtaining the theoretical temperature of a target position in the battery based on the total battery heat and the battery mesh comprises sub-steps S41 to S43.

S41: Construct a heat conduction equation based on the total battery heat and the battery mesh, wherein the heat conduction equation is shown in the following formula (5).

$$\begin{cases} u = u(x, y, z, t) \\ \frac{\partial u}{\partial t} = a_x \times \frac{\partial^2 u}{\partial x^2} + a_y \times \frac{\partial^2 u}{\partial y^2} + a_z \times \frac{\partial^2 u}{\partial z^2} + Q, \\ u(x, y, 0) = v_o(x, y, z) \end{cases} \quad \text{formula (5)}$$

$a_x$, $a_y$, and $a_z$ respectively represent thermal diffusion coefficients in the x direction, the y direction, and the z direction, $v_o(x,y,z)$ represents an initial value condition, Q is a heat source term, and t is a time term.

S42: Discretize the heat conduction equation. Optionally, in sub-step S42, the time term t in formula (5) may be discretized by using the Euler method, thus the discretized heat conduction equation is shown in the following formula (6).

$$\begin{cases} u^{n+1} = u^n + \frac{\partial u^n}{\partial t} \times \Delta t = u_n + \left( \begin{array}{c} a_x \times \frac{\partial^2 u}{\partial x^2} + a_y \times \frac{\partial^2 u}{\partial y^2} + \\ a_z \times \frac{\partial^2 u}{\partial z^2} + Q \end{array} \right) \times \Delta t \\ u_0 = v_0(x, y, z), u(x, y, z, t_{n+1}) = u^{n+1} \end{cases} \quad \text{formula (6)}$$

while n is an integer.

S43: Solve the discretized heat conduction equation (5) to obtain the theoretical temperature of the target position in the battery. For example, the discretized heat conduction equation (5) may be solved by using the meshing and the finite volume method to obtain the theoretical temperature of the target position in the battery.

In contrast, the battery thermal calculation methods based on lumped models overlook the effects of battery shapes and internal heat transfer, which result in significant errors. However, in the present disclosure, the theoretical temperature of the target position in the battery is calculated based on the heat conduction equations, which have higher accuracy.

Figure 5:
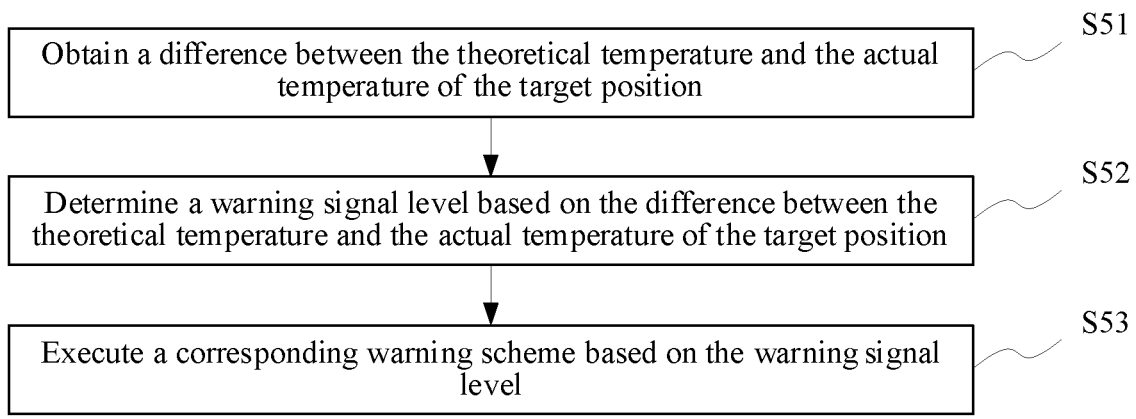
FIG. 5 is a flowchart of sub-steps of executing a battery overheat warning scheme according to an embodiment of the present disclosure.

Referring to FIG. 5, in an embodiment of the present disclosure, sending the warning signal based on the theoretical temperature and the actual temperature of the target position in the battery comprises sub-steps S51 to S53.

S51: Obtain a difference between the theoretical temperature and the actual temperature of the target position in the battery.

S52: Determine a warning signal level based on the difference between the theoretical temperature and the actual temperature of the target position in the battery. Specifically, during normal operation of the battery, the difference between the theoretical temperature and the actual temperature should be within an allowable range. If the difference between the theoretical temperature and the actual temperature is relatively large, it may be determined that problems may have occurred in one or more steps, so a warning signal should be sent at this time. The larger the difference between the theoretical temperature and the actual temperature is, the more serious the problem can be, thus the higher the warning signal level will be. Therefore, in sub-step S52, the warning signal level may be determined based on a magnitude of the difference.

S53: Execute a corresponding warning scheme based on the warning signal level. Specifically, a corresponding warning scheme may be configured for each warning signal level in advance. When the present warning signal level is determined in sub-step S52, the corresponding warning scheme may be obtained and executed based on the present warning signal level in sub-step S53. Taking a three-level warning system as an example: the first-level warning could involve issuing a warning signal and reminding the users to perform maintenance during their free time; the second-level warning could involve immediately interrupting the electric current inputs to the relevant battery unit and alerting the users to perform maintenance; and the third-level warning could involve immediately cutting off the battery power plus setting up fire-fighting equipment to cool down the affected areas.

In summary, this battery overheat warning method combines performing electrochemical modeling of the battery mesh, setting up the three-dimensional finite volume methods, and applying finite element methods to create a battery overheat warning system. The system generates warning schemes by comparing an accurately calculated theoretical temperature at a target location with an actual temperature detected by multiple temperature sensors. In addition, this battery overheat warning method can use irregular battery meshing techniques and structural parameters of these batteries to perform three-dimensional thermal modeling of battery packs regarding their energy storage, further improving accuracy.

Figure 6:
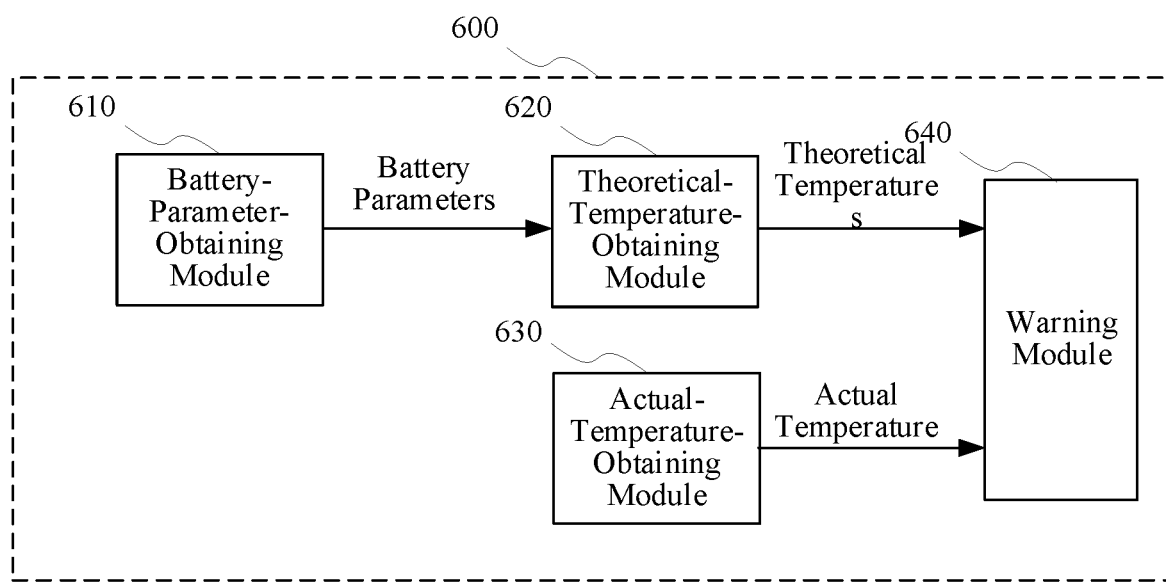
FIG. 6 is a schematic block diagram of a battery overheat warning system according to an embodiment of the present disclosure.

The present disclosure further provides a battery overheat warning system. Referring to FIG. 6, in an embodiment of the present disclosure, the battery overheat warning system 600 comprises a battery-parameter-obtaining module 610, a theoretical-temperature-obtaining module 620, an actual-temperature-obtaining module 630, and a warning module 640. The battery-parameter-obtaining module 610 is configured to obtain working condition parameters and geometric parameters of a battery. The theoretical-temperature-obtaining module 620 is connected to the battery-parameter-obtaining module 610, and is configured to obtain a theoretical temperature of a target position in the battery based on the working condition parameters and the geometric parameters of the battery. The actual-temperature-obtaining module 630 is connected to a temperature transducer, and is configured to obtain an actual temperature of the target position in the battery by using the temperature transducer. The warning module 640 is connected to the theoreticaltemperature-obtaining module 620 and the actual-temperature-obtaining module 630, and is configured to decide whether a warning should be sent based on the theoretical temperature and the actual temperature of the target position in the battery.

It should be noted that, in one embodiment, modules of the battery overheat warning system 600 may perform procedures correspond to the method described in steps S11 to S14 in FIG. 1.

Based on the above description of the battery overheat warning method, the present disclosure further provides a non-transitory computer-readable storage medium, which stores a computer program. When the computer program is executed by a processor, the battery overheat warning method shown in FIG. 1 is then implemented.

Figure 7:
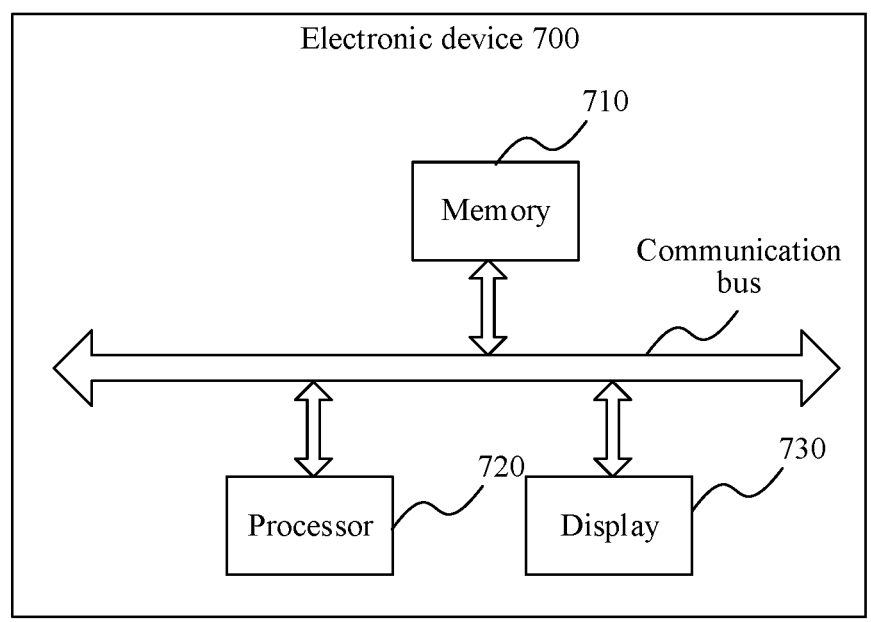
FIG. 7 is a schematic block diagram of an electronic device according to an embodiment of the present disclosure.

The present disclosure further provides an electronic device. Referring to FIG. 7, in an embodiment of the present disclosure, the electronic device 700 comprises a memory device 710 and a processor 720. The memory device 710 is configured to store a computer program. The processor 720 is communicatively connected to the memory device 710, and is configured to perform the battery overheat warning method shown in FIG. 7 when invoking the computer program.

Optionally, the electronic device 7 may further comprise a display device 730. The display device 730 is communicatively connected to the memory device 710 and the processor 720, and is configured to display a GUI interactive interface related to the battery overheat warning method.

It should be noted that, the memory device 710 may be a volatile memory device or a non-volatile memory device, or may comprise both a volatile memory device and a non-volatile memory device. The non-volatile memory device may be a read-only memory (ROM) device, a programmable ROM (PROM) device, an erasable PROM (EPROM) device, an electrical EPROM (EEPROM) device, or a flash memory device. The volatile memory device may be a random-access memory (RAM) device that is used as an external cache memory.

In addition, the processor 720 may be a general-purpose processor, a digital signal processor (DSP), an application-specific-integrated circuit (ASIC), a field programmable gate array (FPGA) device or another programmable logic device, a discrete gate or a transistor logic device, a discrete hardware component, or the like.

The execution orders of various steps of the battery overheat warning method enumerated in the present disclosure are only examples of the presently disclosed techniques, and are not intended to limit the scope of the presently disclosed invention. Any omission or replacement of the steps, and extra steps consistent with the principles of the present invention are within the scope of the present disclosure.

The present disclosure further provides a battery overheat warning system. The battery overheat warning system can implement the battery overheat warning method of the present disclosure. However, potential devices for implementing the battery overheat warning method are not limited to the battery overheat warning system disclosed herein. All structural modifications and replacements made according to the principles of the present disclosure all fall within the protection scope of the present disclosure.

Based on the above, according to the battery overheat warning method provided in one or more embodiments of the present disclosure, the theoretical temperature of the target position in the battery can be obtained based on the working condition parameters and the geometric parameters of the battery, and the actual temperature of the target position in the battery is obtained through a transducer. Based on the theoretical temperature and the actual temperature of the battery at the target position in the battery, according to the battery overheat warning method, a warning signal level of the energy storage power station can be accurately and timely determined to decide whether a warning signal should be sent.

In addition, applying the battery overheat warning method, the warning signal level of the energy storage power station may be determined based on the difference between the theoretical temperature and the actual temperature of the target position in the battery, to decide whether a warning should be sent. Therefore, even if the actual temperature of the target position in the battery collected by the temperature transducers is normal, an abnormal status of the battery can still be found and trigger a warning signal.

Furthermore, applying the battery overheat warning method, the discrete heat conduction equation can be solved by generating the battery mesh and employing finite volume and finite element methods, which enhances precision and accuracy of the method.

Further, energy storage power stations are typically equipped with temperature sensors recording the actual temperature of target locations, as well as devices monitoring batteries' operating parameters during normal operation. As a result, the battery overheat warning method of the present disclosure can make use of the existing temperature sensors and battery operating parameters, and minimize labor and material costs while enhancing accuracy.

Therefore, the present disclosure effectively overcomes various shortcomings in the current techniques, and has high industrial utilization value.

While particular elements, embodiments, and applications of the present disclosure have been shown and described, it is understood that the present disclosure is not limited thereto because modifications may be made by those skilled in the art, particularly in light of the foregoing teaching. It is therefore contemplated by the appended claims to cover such modifications and incorporate those features which come within the spirit and scope of the present disclosure.

What is claimed is:

1. A method for warning battery overheat, comprising:
   obtaining working condition parameters and geometric parameters of a battery;
   obtaining a theoretical temperature at a target position in the battery based on the working condition parameters and the geometric parameters of the battery;
   obtaining an actual temperature of the target position in the battery by using a temperature transducer; and
   sending a warning signal based on the theoretical temperature and the actual temperature of the target position in the battery.

2. The battery overheat warning method as in claim 1, wherein obtaining the theoretical temperature of the target position in the battery based on the working condition parameters and the geometric parameters of the battery comprises:
   obtaining a total battery heat based on the working condition parameters of the battery, wherein the total battery heat comprises a heat absorbed and/or a heat released by the battery;
   generating a battery mesh based on the geometric parameters of the battery; and
   obtaining the theoretical temperature of the target position in the battery based on the total battery heat and the battery mesh.

3. The battery overheat warning method as in claim 2, wherein obtaining the total battery heat based on the working condition parameters of the battery comprises:
   obtaining electrochemical parameters of the battery based on the working condition parameters of the battery;
   obtaining a polarization heat, a reaction heat, and an ohmic heat of the battery during a battery discharge based on the electrochemical parameters of the battery; and
   obtaining the total battery heat based on the polarization heat, the reaction heat, and the ohmic heat of the battery during the battery discharge.

4. The battery overheat warning method as in claim 2, wherein obtaining the theoretical temperature of the target position in the battery based on the total battery heat and the battery mesh comprises:
   constructing a heat conduction equation based on the total battery heat and the battery mesh;
   discretizing the heat conduction equation; and
   solving the discretized heat conduction equation to obtain the theoretical temperature of the target position in the battery mesh.

5. The battery overheat warning method as in claim 1, wherein sending the warning signal based on the theoretical temperature and the actual temperature of the target position in the battery comprises:
   obtaining a difference between the theoretical temperature and the actual temperature of the target position in the battery;
   determining a warning signal level based on the difference between the theoretical temperature and the actual temperature of the target position in the battery; and
   executing a corresponding warning scheme based on the warning signal level.

6. The battery overheat warning method as in claim 1, wherein the working condition parameters of the battery comprise a current and a voltage in an operating state of the battery, and wherein the geometric parameters of the battery comprise a size, a tab position, and a tab size of the battery.

7. The battery overheat warning method as in claim 1, wherein the battery comprises a lithium ion battery in an energy storage power station.

8. A battery overheat warning system, comprising:
   a battery-parameter-obtaining module, configured to obtain working condition parameters and geometric parameters of a battery;
   a theoretical-temperature-obtaining module, configured to obtain a theoretical temperature of a target position in the battery based on the working condition parameters and the geometric parameters of the battery;
   an actual-temperature-obtaining module, configured to obtain an actual temperature of the target position in the battery by using a temperature transducer; and
   an overheat-warning module, configured to decide whether an overheat warning signal should be sent out based on a difference of the theoretical temperature and the actual temperature of the target position in the battery.

9. A computer-readable storage medium, storing a computer program, wherein when the computer program is executed by a processor, the battery overheat warning method as in claim 1 is implemented.

10. An electronic device, comprising:
   a memory device, storing a computer program; and
   a processor, communicatively connected to the memory device, wherein when the computer program is invoked, the battery overheat warning method as in claim 1 is performed.

* * * * *